(12) United States Patent
Agudo Crespo

(10) Patent No.: US 11,191,348 B2
(45) Date of Patent: Dec. 7, 2021

(54) DEVICE FOR ASSISTED TEETH CLEANING

(71) Applicant: ZIZ DENTAL CARE S.L., Madrid (ES)

(72) Inventor: María Belén Agudo Crespo, Madrid (ES)

(73) Assignee: ZIZ DENTAL CARE, S.L., Madrid (ES)

( * ) Notice: Subject to any disclaimer, the term of this patent is extended or adjusted under 35 U.S.C. 154(b) by 228 days.

(21) Appl. No.: 16/335,575

(22) PCT Filed: Sep. 22, 2017

(86) PCT No.: PCT/ES2017/000116
§ 371 (c)(1),
(2) Date: Mar. 21, 2019

(87) PCT Pub. No.: WO2018/055218
PCT Pub. Date: Mar. 29, 2018

(65) Prior Publication Data
US 2020/0054121 A1 Feb. 20, 2020

(30) Foreign Application Priority Data

Sep. 23, 2016 (EP) .................................... 16380033

(51) Int. Cl.
*A46B 9/04* (2006.01)
*A46B 5/00* (2006.01)

(52) U.S. Cl.
CPC ............ *A46B 9/045* (2013.01); *A46B 5/0058* (2013.01); *A46B 2200/1066* (2013.01)

(58) Field of Classification Search
CPC ....... A46B 9/045; A46B 5/0058; A46B 9/026; A46B 5/054
See application file for complete search history.

(56) References Cited

U.S. PATENT DOCUMENTS 1,492,660 A 5/1924 Arkus
1,616,484 A 2/1927 Beynon
(Continued)

FOREIGN PATENT DOCUMENTS

CN 103156382 A 6/2013
FR 3047893 A1 * 8/2017 ........... A61C 17/349

OTHER PUBLICATIONS

International Search Report for PCT/ES2017/000116 dated Jan. 23, 2018 [PCT/ISA/210].
(Continued)

*Primary Examiner* — Shay Karls
(74) *Attorney, Agent, or Firm* — Sughrue Mion, PLLC

(57) ABSTRACT

Assisted dental cleaning device which allows brushing of both sides of the teeth and both arches simultaneously, in an assisted manner for all those unable to do it for themselves, not only due to age, but also due to disability or lack of motor skills, so that brushing is done by another person ensuring proper brushing all of the teeth of the person who is unable to do it for themselves. The device also allows for self-brushing where a reduction of cleaning time and an easier and more convenient brushing process of the two dental arches is sought. This is a device with specific application for the brushing of teeth for children, elderly or handicapped with disabilities or lack of upper extremities. It is also very useful for cleaning animals and pets' teeth.

20 Claims, 10 Drawing Sheets

(56) References Cited

U.S. PATENT DOCUMENTS

| | | | |
|---|---|---|---|
| 1,894,509 A | 1/1933 | Booth | |
| 6,343,396 B1 | 2/2002 | Simovitz et al. | |
| 2011/0191971 A1* | 8/2011 | Zeng | A46B 5/0054 15/167.2 |

OTHER PUBLICATIONS

Written Opinion for PCT/ES2017/000116 dated Jan. 23, 2018 [PCT/ISA/237].
International Preliminary Report for PCT/ES2017/000116 dated Oct. 31, 2018 [PCT/IPEA/409].

* cited by examiner

DEVICE FOR ASSISTED TEETH CLEANING

CROSS REFERENCE TO RELATED APPLICATIONS

This application is a National Stage of International Application No. PCT/ES2017/000116 filed Sep. 22, 2017, claiming priority based on European Patent Application No. EP16380033 filed Sep. 23, 2016.

OBJECT OF THE INVENTION

The invention, refers to a type of assisted dental cleaning device allowing brushing on both sides of the teeth, top and lower row, at the same time. For all of those unable to do it by themselves, both due to age, disability or lack of motor skills, brushing is done by a carer ensuring proper brushing of all teeth of the person who is unable to do it by themselves. The device also allows a self-brushing to reduce the cleaning time and to have an easier and more convenient brushing process since it is done simultaneously in both dental arches and on both sides of the teeth. This is a brushing device specifically for children, elderly or handicapped, disabled people, or those ones lacking of upper extremities. It is also useful for cleaning animals and pets' teeth.

The scope of the present invention is within the oral hygiene sector.

BACKGROUND TO THE INVENTION

The technical problem that the present invention aims address is to facilitate proper brushing of teeth by another person in the event that an individual cannot brush them themselves mainly because of their age, physical or mental impairment. This invention would allow this task to be carried out safely, facilitating the movement of the brush around the teeth, ensuring access to all teeth and avoiding harm to the assisted person, such as those derived from the current technology used in the construction and design of state of the art. Specifically, the drawbacks would include:

- The current heads do not adapt to the natural curvature of the dental arches, particularly in the inner face of them. Current toothbrushes are only one piece, consisting of an integrated head and handle, which neither facilitates the cleaning of the entire arch path nor the adaptation of the head to different areas of the dental arches.
- Current toothbrushes, with only one face, do not allow assisted cleaning by a third party, on the inner surfaces of the teeth without causing harm.

The state of the art, nowadays, is limited to many devices for oral hygiene or toothbrushes, where practically all have a universal design (rigid handle integrated with a head with bristles), with the only difference between each in the head design and arrangement of the bristles but without differences in the functionality of the device. Likewise, the state of the art includes electrical oral hygiene devices which also have the handle integrated with a head with bristles arranged in various ways on the head, that rotate with respect to the handle so that the user holds the handle while the head is moved around the arches.

However, it is well known in the dental industry and recommended by most dentists and hygienists, that the suitable cleaning of the teeth requires the user to generate a vertical movement over them, that is, a top to bottom movement generated by the user.

This vertical and even the horizontal movement of brushing, whilst applied by adults themselves does not imply a great difficulty, however in the case of children and people with physical or mental disabilities, it does involve some difficulty or it is even impossible, thus requiring another person to assist the child or disabled during the cleaning so that it is correctly carried out.

The applicant is unaware of a device for cleaning teeth or a toothbrush which allows brushing of one person by another, in an assisted manner, in a way that complies with the widely accepted recommendations by dentists regarding the brushing of teeth with a vertical movement of the head's bristles over the teeth, while allowing the cleaning of both sides of the dental arches.

Optimal cleaning is guaranteed with the use of this invention, as well as the reduction of the time required for cleaning and the possibility of harming the person when brushing is carried out by a third party.

EXPLANATION OF THE INVENTION

It is a primary object of the present invention to provide an assisted oral hygiene device, namely a device comprising a frame with means for the cleaning of teeth, a head with means for the cleaning of teeth, means to connect the head and the frames that allow, at least, a vertical movement of the head with respect to the frame, a handle, and means to connect the external part of the head and to handle that enables rotation of the handle with respect to the head.

Specifically, the head is movable and it is joined to the frame by means or connecting elements between each that allow at least vertical movement of the head with respect to the frame. Sometimes this vertical movement of the head with respect to the frame can be supplemented by a horizontal and/or circular and or elliptical movement. Besides, the handle acts as the element that causes the movement of the head relative to the frame of the cleaning device. This handle facilitates the use of the brush by an assistant, for which the device comprises means to connect the external part of the head and to handle that enables its use, preferably as spherical articulation. These means of joining both components together with the design of the handle, allow rotation of the handle with respect to the head, thus allowing the use of the handle and therefore of the device by the assistant from any position, particularly from the front or the side of the person who is being assisted in the brushing of their teeth. These means of rotary coupling are preferably a housing with a cavity slightly larger than a hemisphere and a spherical body inside so that the housing can be located in the head and the spherical body at the end of the handle, or vice versa. These means of coupling allow the handle to pivot on the head 360° and thus relative to the frame.

As mentioned, the above construction method allows the person, who is holding the handle, to move the elements for tooth cleaning that are fixed to the head, at least vertically, as well as allowing the elements for cleaning of the frame and the head along the dental arches, from left to right or vice versa, easily and without risk of harm to the person whose teeth are being brushed.

The frame and the mobile head of this assisted dental device present, when they are joined, a section that shows two housings, an upper and a lower one, separated by a base, to receive in an upper housing the teeth of the upper arch and a lower housing to receive the teeth of the lower arch. The shape of these housings are delimited by a rear wall and a flexible front wall and both with the necessary concave and convex shape to adapt to the curvature of the dental arches.

The rear wall is situated in the rear face or inside of the teeth, applying a slight pressure on the teeth. The rear wall joins the front wall by a base or means of intermediate connection.

To achieve this shape, the frame has a body which includes at least the following:

A rear wall, which may comprise in turn an upper portion and a lower portion at an angle between each other, which may have, the rear wall itself or its portions, a convex or concave curvature with respect to the teeth Some means of joining to receive the mobile head, opposite to the rear wall and forming the front of the frame, presenting, these means of joining, different configurations, and Some intermediate means of joining placed horizontally between the rear wall and the connecting means, uniting them.

The upper portion and the lower portion of the rear wall, are separated by intermediate means of attachment, these portions may present an angle of between 45° and 105° with those intermediate means of attachment, that is, the upper and lower ends of the portions may move closer or further away from the connecting means with the head respectively. The material of the rear wall, that is, of the upper and lower portions, permits them front angle to be variable, allowing it to increase depending on the size of the teeth as they enter into the housing. Thus, the section established by the frame and the mobile head with respect to it can have a vertical left side, a rear wall, divided in two portions and each one of those sloped towards the right hand side or towards the left hand side, with the possibility of these portions being curved. In the present description, when referring to the section of the frame and the head, reference may indiscriminately be made to any of the shapes previously described, except when explicit reference is made to one of them.

Also, and as explained previously, the angles formed between the upper and lower portions and the means of connection may vary during use, that is, they are not rigid but flexible, allowing their adaptation to the size of the teeth. This it is mainly due to the material with which the body of the frame and its various elements are made.

The head preferably has a body with four sides, rectangular or square, with rounded corners, but may also be elliptical or oval, which unites with the aforementioned means of connection that form the back or front of the frame by means of complementary connections which enable the head, activated by the handle, to have, at least, a vertical movement respect to the frame. Additionally, the means of connection allow lateral movements of the head with respect to the frame as well as circular movements of the head relative to the frame.

The handle is attached to the front of the head by a ball joint, so that the handle can rotate relative to the head.

All those elements that are or may be in contact with the teeth, have means to cleaning them, these means may include, among others, bristles, wipes or sponges. These elements are the inside of the rear wall of the frame, the surfaces of the intermediate means of connection and the inside part of the mobile head, which may also be comprised of cleaning plates. These elements are preferably covered with bristles whose length is variable depending on the element and its position in the device. For example, the bristles of means of connection can be from 1 to 3 mm while the bristles of the front and rear walls may have a length up to 1 cm, and these bristles are preferably integrated in the frame material. In any case, it is clear that the length of the bristles can vary depending on the needs and construction of the device and the target audience of the same, since the device for and adult or a child would not be the same. In the event that the cleaning media were sponges, wipes or other such means their thickness may be also variable.

The means of connection between the head and the frame may comprise different configurations, as mentioned before for example:

In one configuration, the means of connection comprise a front wall attached to the back wall by intermediate means of union and having this front wall holes with a diamond shape in which lugs are housed that are fixed to the back of the head. To secure the connection between the head and the front wall of the frame, the lugs of the head couple to the cleaning plates so that the front wall of the frame is located between the plates and the head. The diamond shaped holes allow the logs to move within the same in vertical, horizontal or circular paths, activated by the handle that moves the head which in turn moves the cleaning plates that brush the teeth. In this configuration, the intermediate means of connection can be formed by a horizontal body which runs along the inside of the rear wall and the inside of the front wall, or only joins the side of those walls.

In another configuration, similar to that above, the holes in the front wall are replaced by slots that allow only vertical movement of the head and the cleaning plates relative to the frame.

In another configuration, the means of connection of the frame comprises a mount inside which the head is inserted, this mount has, either on its lower and upper horizontal sides, or on its vertical lateral sides, or on both sides, guides or rails into which the ends of the head are respectively inserted. By this configuration, and depending on where the guides are located, vertical movement and additionally horizontal movement from the head with respect to the frame, are possible, when the ends of the head slide on the afore-mentioned guides or rails. In this configuration the means of attachment can, as in the previous case, slide along the whole inside of the rear wall of the frame or only be located at the ends only this. Also in this configuration, it is the inner part of the head that comprises the means for cleaning the teeth.

In an alternative configuration, the means of connection comprise two vertical supports with lugs that attach to an independent mount and which are attached to the rear wall of the frame by means of intermediate connection. On this mount, having in its upper and lower sides grooves or guides, the head is installed and in these grooves the ends of the head are inserted, thus allowing vertical movement of the head with respect to the mount integrated in the frame.

In another configuration, it is the side supports of the above configuration which play the role of the guide and on which the head moves, through projections that slides within the guides.

Regardless of the configuration of the means of connection between the frame and the head, the assisted oral cleaning device, object of the present invention, requires that the user, who is going to clean the teeth, inserts the teeth between the rear wall of the frame, intermediate means of connection and the head with its means of connection, that is, upper housing and lower housing.

Preferably, both the frame and the head are of an adaptable material with elastic properties (rubber or similar) that on one hand allows the adaptation and adjustment of the pressure of the device on the teeth for effective removal of biofilm attached thereto, and furthermore, it allows the accommodation of teeth with different widths. As stated before, the section formed by the frame and the head, which establishes the upper and lower housing, presents certain degree of elasticity due to the characteristics of the material already mentioned to adapt themselves to the arches. This allows both the rear wall of the frame and the head to always be in contact with both, inside and outside faces of the dental arches, allowing also to move the brush along the entire path of the arch, adapting both walls of the frame section and the head both to the area of the front teeth area and the molars, and not only in the base of frame but also in the walls.

Also, the device may incorporate an electrically powered vibrator in the handle, for example by incorporating a battery inside the handle which connected to the head would allow the use of vertical vibratory movements thus helping the cleaning with a greater number of movements per second.

DESCRIPTION OF THE DRAWINGS

To complete the description of the invention and in order to complete and facilitate the understanding of the characteristics thereof, a set of drawings is attached to the present specification, which with an illustrative and non-limiting character, represent embodiments of the invention:

FIG. 11b shows a section of the embodiment of the of cleaning device in FIG. 11a.

FIG. 12b shows a section of the embodiment of the cleaning device in FIG. 12a.

PREFERRED EMBODIMENT OF THE INVENTION

Figure 1:
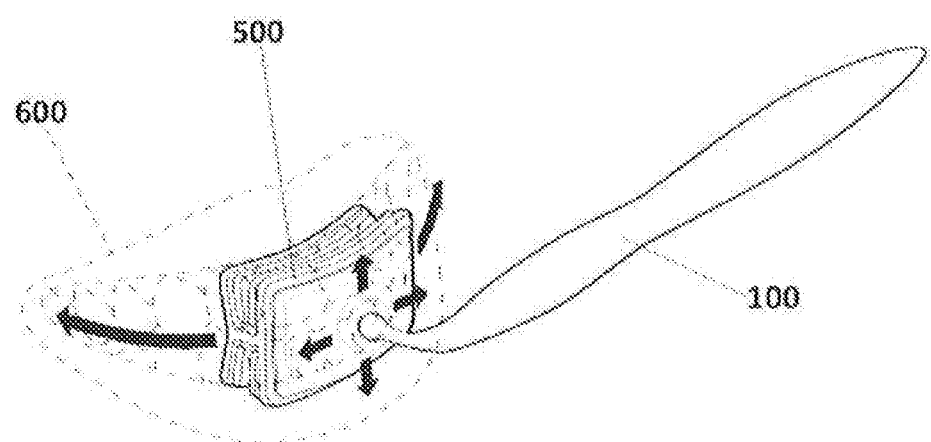
FIG. 1 shows a perspective view of the first example of the assisted dental cleaning device object of this invention.
Figure 2:
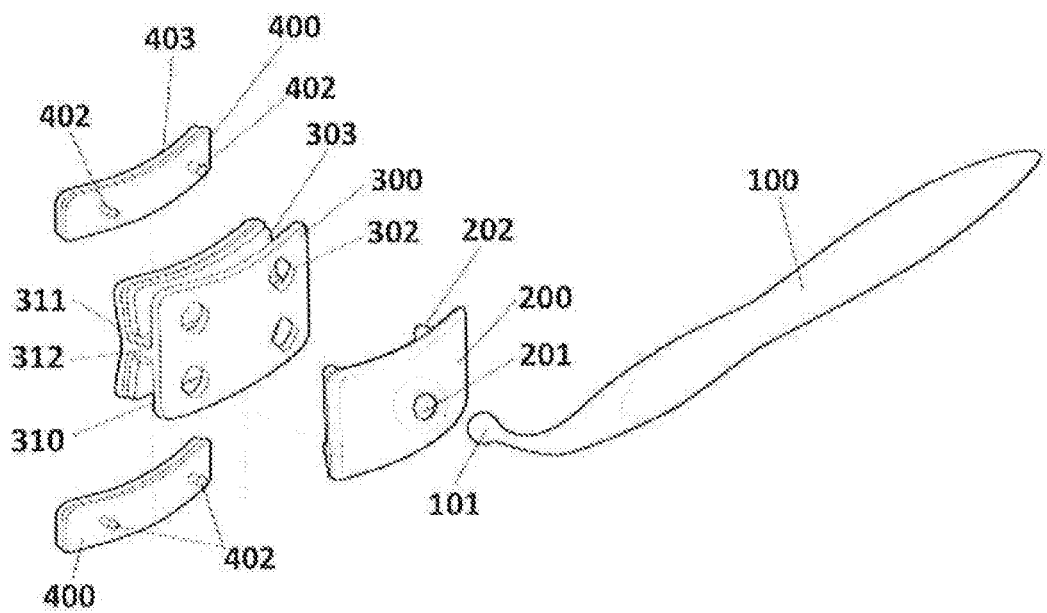
FIG. 2 shows a first embodiment of an exploded view of the device shown in FIG. 1.

Below, different embodiments of the present invention, are described, which in no case are limitative, Specifically, FIGS. 1 and 2 show a first tooth cleaning device 500 or toothbrush comprising a frame 300 with means for cleaning the teeth 303, a head 200 with means for cleaning the teeth 400, means of connection 310 between the head 200 and the frame 300 which allow vertical and horizontal movement of the head 200 relative to the frame 300, a handle 100, and means of coupling 201 between the head 200 and handle 100 which allows rotation of the handle 100 relative the head 200.

FIG. 1 shows the movement of the head 200 relative to the frame 400 in at least two directions, and the movement of the frame 300 along the teeth 600.

FIG. 2 shows an exploded view of the first embodiment of brush 500 with the frame 300, a head 200, a handle 100 and means of connection 312 of the head 200 to the frame 300.

The frame 300 has a body with a section that determines an upper housing and a lower housing, showing its two rear walls slightly inclined towards the rear. Specifically, it shows:

A rear wall 311, which in turn can comprise an upper part and a lower part angled to each other, means of connection to receive the movable head 200, opposite the rear wall 311 and forming the part or front wall 310 of the frame 300, and intermediate means of union 312 horizontally arranged between the rear wall 311 and the means of connection 310, along the two walls 310 and 311 of the frame 300 and joining both.

Specifically, the means of connection 310 comprise a front wall 310, attached to the back wall 311 by means of intermediate union 312, in this case a horizontal base perpendicular to the front wall 310 which runs along the two walls of the frame 300 front one 310 and rear one 311 between each other. The front wall 310 has holes or openings 302, preferably diamond-shaped, which are traversed by the existing means of union between the plates 400 and the head 200. Such means of connection are specifically a hollow cylinder 202 located in the front of the head 200 and a lug 402 located at the rear of the plate 400. In the assembly, the cylinder 202 and the lug 402 are coupled through the holes 302 of the frame 300 so that the front wall 310 is located between the plate 400 and the head 200.

It should be noted that the example shows two plates 400, one upper and one lower, on both sides of the base 312 which acts as an intermediate means of union. These diamond shaped holes 302 allow the lugs on the head 202 to move within the holes 302 drawing vertical, horizontal or circular paths, pulled by the handle 100 which moves the head 200. The head, being joined to the cleaning plates 400 also pulls them with its movement, producing the cleaning of the teeth.

All the elements that are likely to be in contact with the teeth include means for their cleaning 403, 303, these means can be, among others, bristles, towelettes or sponges, so in the present embodiment, the inside of the rear wall 311 of the frame 300, the base 312 which acts as a means of intermediate union and the inside of the plates 400, are covered with these means, such as bristles between 1 and 3 mm, depending on the part of the brush 500 in which they are located. Obviously, the means of cleaning may be different depending on the part of the brush in which they are situated, for example, having bristles on the means, of cleaning 312 of the frame 300 and suitable towelettes or similar in the base 312 that connects the rear wall 311 with the front wall 310 of the frame 300. Such means of cleaning may or may not be manufactured in the same material as the frame 300 and thus may or may not form part of the same.

The head 200 is movable relative to the frame 300 and in turn is connected with a handle 100 which allows the movement of the head 200 relative to the frame depending on the means of union existing between the frame 300 and the head 200. This handle 100 facilitates the handling of the brush 500 by an assistant, for which it comprises means of coupling between the head 200 and the handle 100 to allow the coupling and rotation of the handle 100 with respect to the head 200. These means of rotary coupling are preferably a housing 201 with a cavity slightly larger than a hemisphere with a spherical body 101 in its interior so that the housing 201 can be situated in the head 200 and the spherical body 101 in the end of the handle 100, or vice versa. These means allow the handle 100 to rotate 360 degrees on the head 200 and thus relative to the frame 300.

For the use of brush, it is simply necessary to place the teeth of the upper dental arch 600 in the upper housing section formed by the frame and the head, that is, in the space that, exists between the top plate 400, the base 312 of the frame and the top of the rear wall 311 of the frame 300, and the teeth of the lower arch 600 in the lower housing determined by the previous section, that is, in the space between the lower plate 400, the base 312 and the bottom part of the rear wall 311 of the frame. Once the brush 500 is placed between the two arches 600, and without the user biting, the assistant or the user (see FIGS. 13 and 14), holding the handle 100 causes the movement of the frame 300 over the teeth of both arches so that the means for cleaning cover all the teeth. In addition to this path, the device or toothbrush 500 object of the present invention, allows vertical brushing, regardless of the front horizontal movement of the front teeth, as recommended by dental association. It is therefore necessary that the handle moves up and down when the brush 500 is in a certain position, so that the head 200 moved by the handle 100, will move vertically along the holes or orifices 302 of the frame allowing the brushing of the teeth. This vertical movement allowed by the configuration of the holes or orifices 302, may be accompanied by a rotational and/or translational movement.

Figure 3:
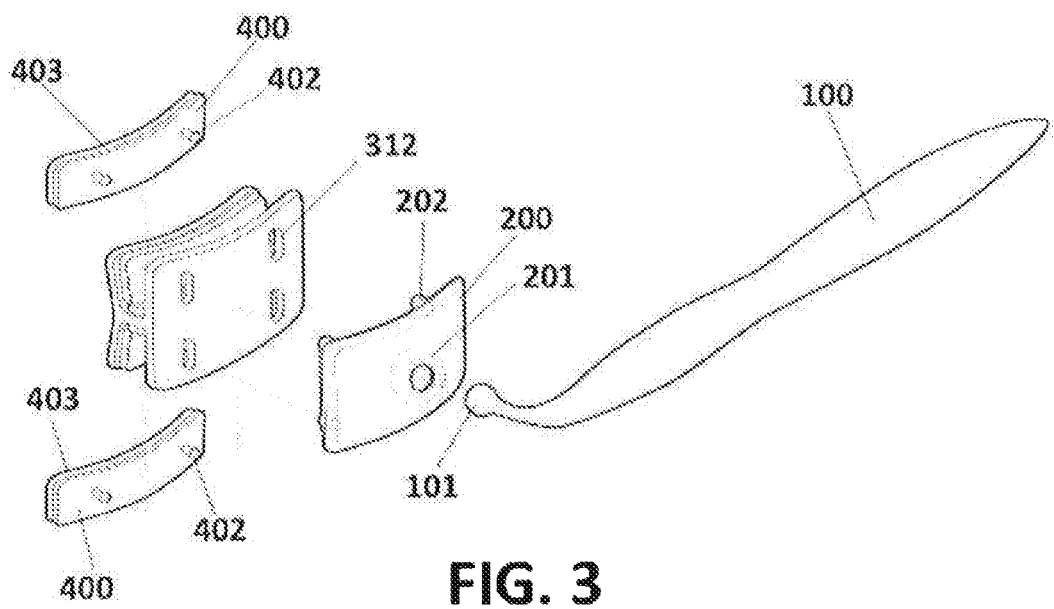
FIG. 3 shows a second embodiment of an exploded view of the device shown in FIG. 1.
Figure 4:
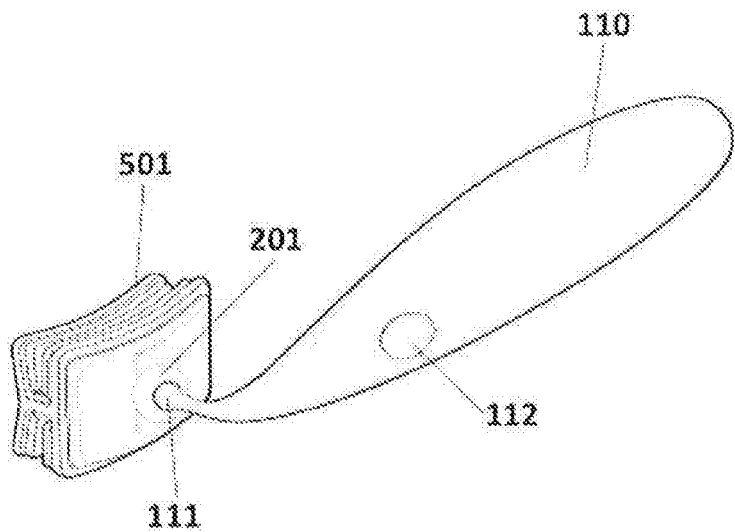
FIG. 4 indicates the vertical movement of the head in the embodiment from FIG. 3 relative to the frame.

FIGS. 2 and 3 show an alternative embodiment to the above, wherein the tooth cleaning device 501 differs from the device 500 in that it only allows a vertical movement of the head 200 relative to the frame 300, and for this, as shown in the figure, the holes or orifices 302 are slots so that the means of union between the plates 400 and the head 200, that is, the cylinders 202 and the lugs 402, can only move up and down. FIG. 3 also shows an example in which the handle contains a battery inside and by pressing a button 112 activates a vibration device 111 located between the handle 110 and the head 200 forcing the displacement of the head 200 with respect to the frame 300. This movement is accompanied by a translatory movement of the brush 501 over the two arches.

Figure 5A:
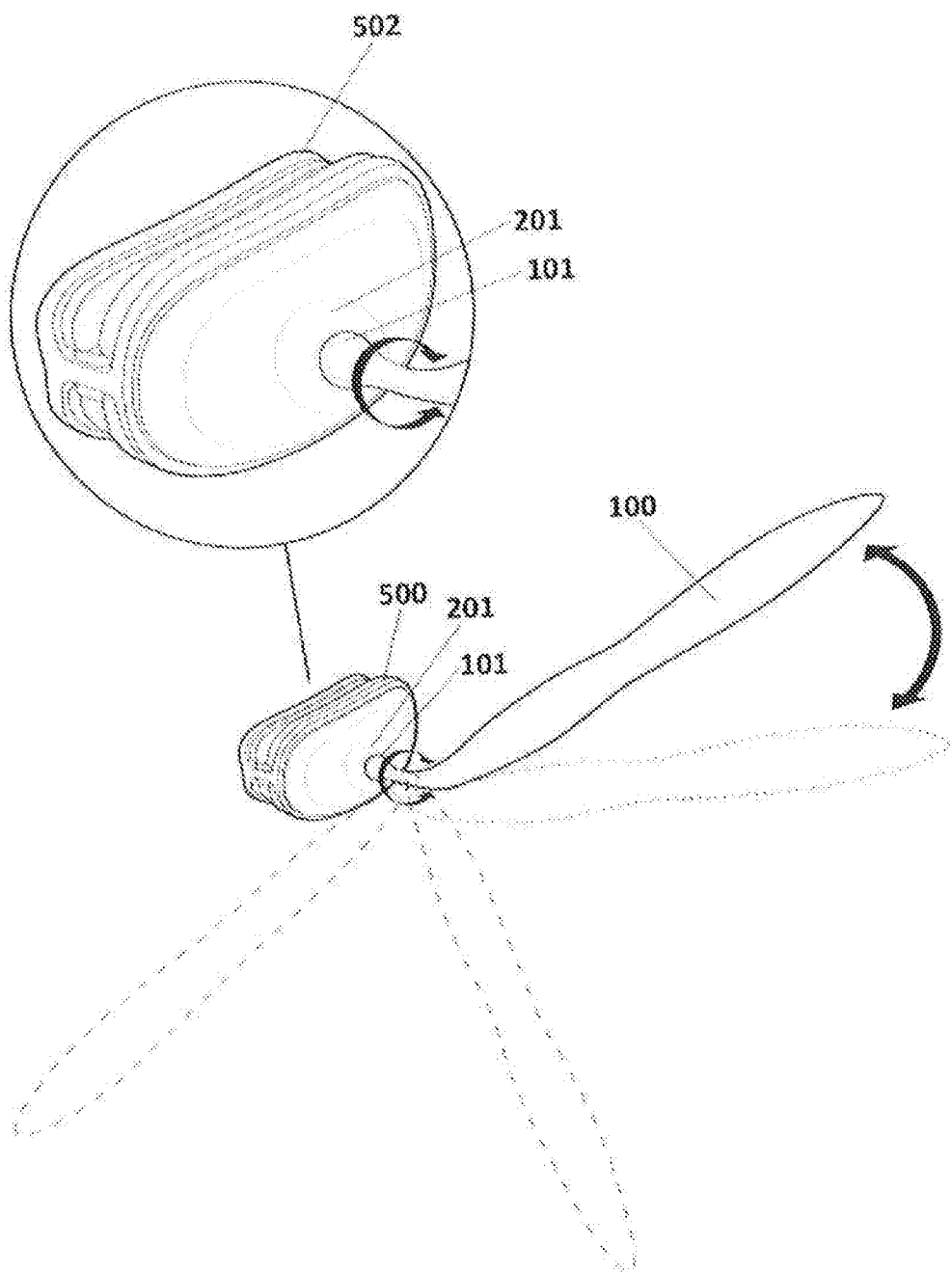
FIG. 5a shows a head and frame with their rectangular shaped bodies with rounded ends.
Figure 5B:
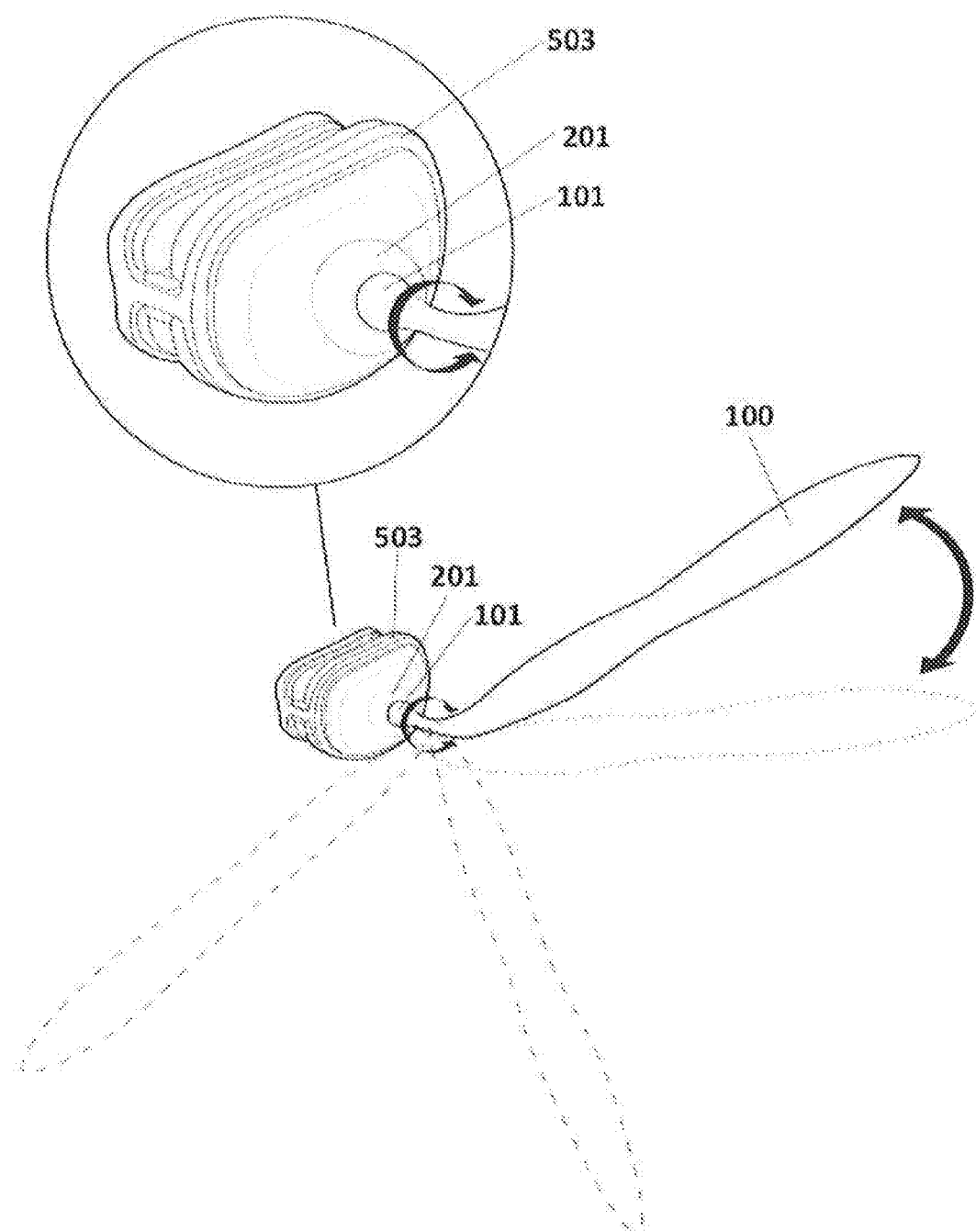
FIG. 5b shows a head and frame with their oval shaped bodies.

In these two examples, the frames have an approximately rectangular configuration with rounded corners, although as shown in FIGS. 5a and 5b, the configuration of the frames and the heads may be different to accommodate different mouths. For example, FIG. 5a shows a frame and a head, essentially rectangular with curved sides, not only the corners, while FIG. 5b shows a squarer shaped frame and head with curved sides, that is, with smaller dimensions than previous ones. Furthermore, the shape of the head and the frame could be oval or elliptical.

Figure 6A:
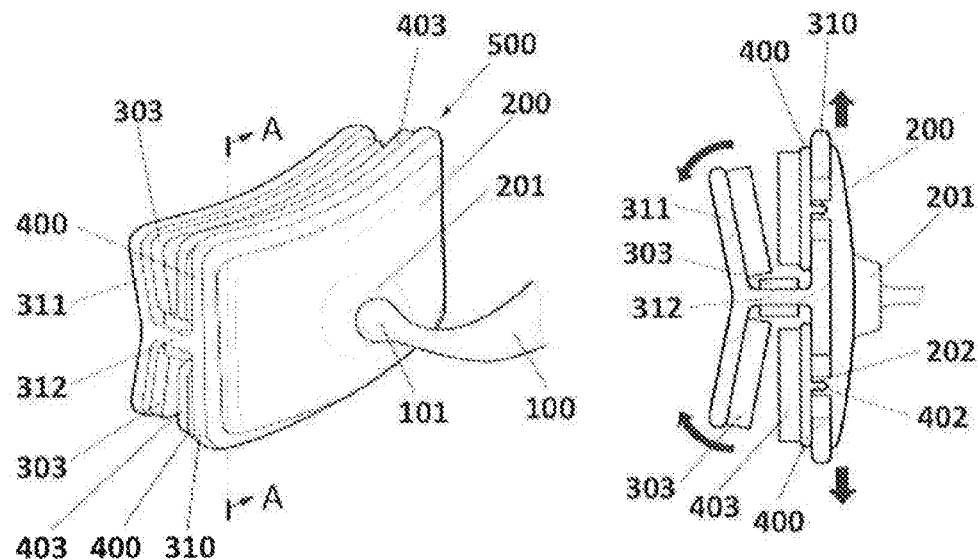
FIGS. 6a and 6b show sections of the first or second embodiment of the device of the present invention.
Figure 6B:
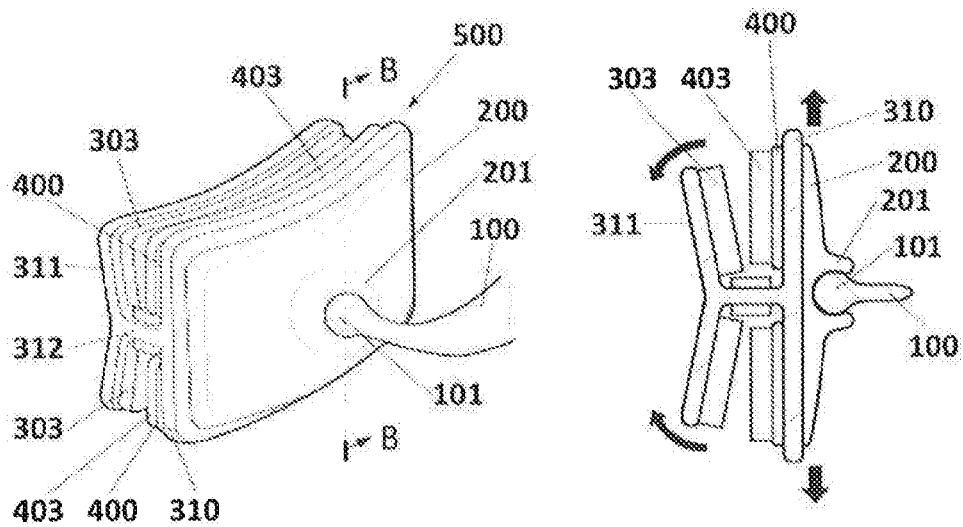

FIGS. 6a and 6b show two sections of the first embodiment 500, in which the arrangement of the top and bottom of the rear wall 311 of the frame 300 is observed, slightly inclined towards the rear of the device 500. Similarly, the rear wall 311, due to the material in which it is fabricated, rubber or similar, allows a slight variation of the angle formed with the base 312 during the use of the device 500. This enables the rear wall 311 to adapt to the inside of both the upper and lower arches. FIG. 6A shows the holes or through holes 302 of the front wall 310 of the frame 300 as well as the means of connection between the plates 400 and the head 200. FIG. 6b shows a section of the rotating coupling between the handle 100 and the head 200.

Figure 7:
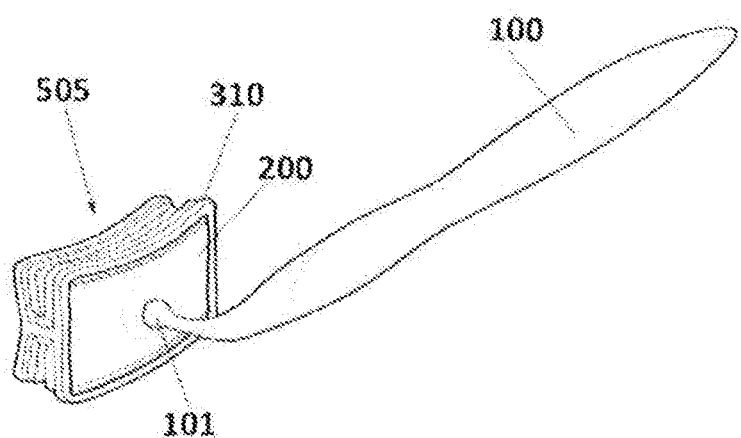
FIG. 7 shows a perspective view of a second example of the assisted oral hygiene device.
Figure 8:
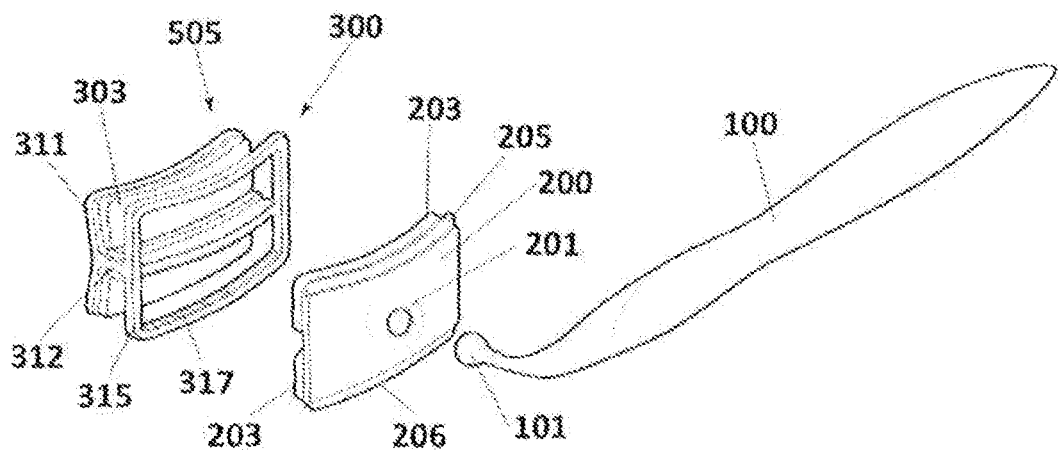
FIG. 8 shows an exploded view of a first embodiment of the assisted oral hygiene device in FIG. 7.
Figure 9:
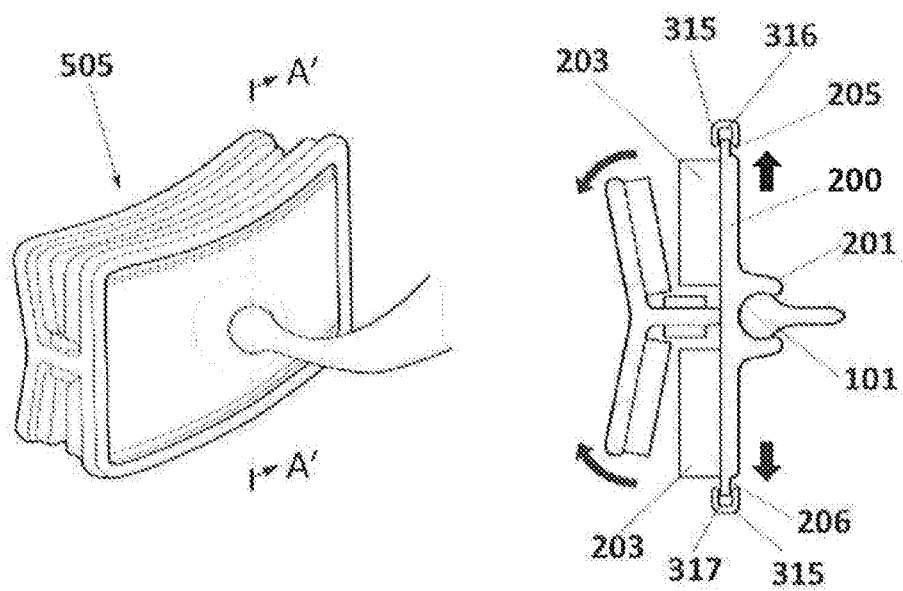
FIG. 9 shows a section of the device in FIG. 7.

FIGS. 7, 8 and 9 show another embodiment of a tooth cleaning device 505 object of this invention. In this example, the means of connection of the frame 300 to couple with the head 200, comprise a frame 315, which replaces the front wall 310 of the frame 300 of the previous examples, into which the head 200 is introduced. For this, the frame 315 comprises in its upper and lower side tracks or rails into which the upper side 205 and lower side 206 of the head 200 are inserted. This arrangement allows the vertical movement of head 200, moved by the handle 100, relative to the frame 300, to go along the upper side 205 and lower side 206 of the head 200, and the top and bottom tracks 317 of the mount 315 in the frame 300. The remaining components of the device 505 have the same construction as the examples of the previous figures. Specifically, a rear wall 311 of the frame with a top and a bottom slightly inclined relative to the base 312; a base 312 that runs along the rear wall 311 of the frame 300 from side to side, establishing two separated holes in the mount 315, and a handle 100 with a rotary coupling to the head 200.

It should be noted that in this example, which dispenses with the plates 400 of the above examples, the device 505 has a head incorporating means for cleaning the teeth, these may be any of those mentioned above. Due to the existence of the base 312 which runs through the mount 315 of the frame 300 from side to side, these means of cleaning 203 are separated in two parts, one upper and one lower, to allow vertical movement of the head 200 relative to the frame 300.

Figure 10:
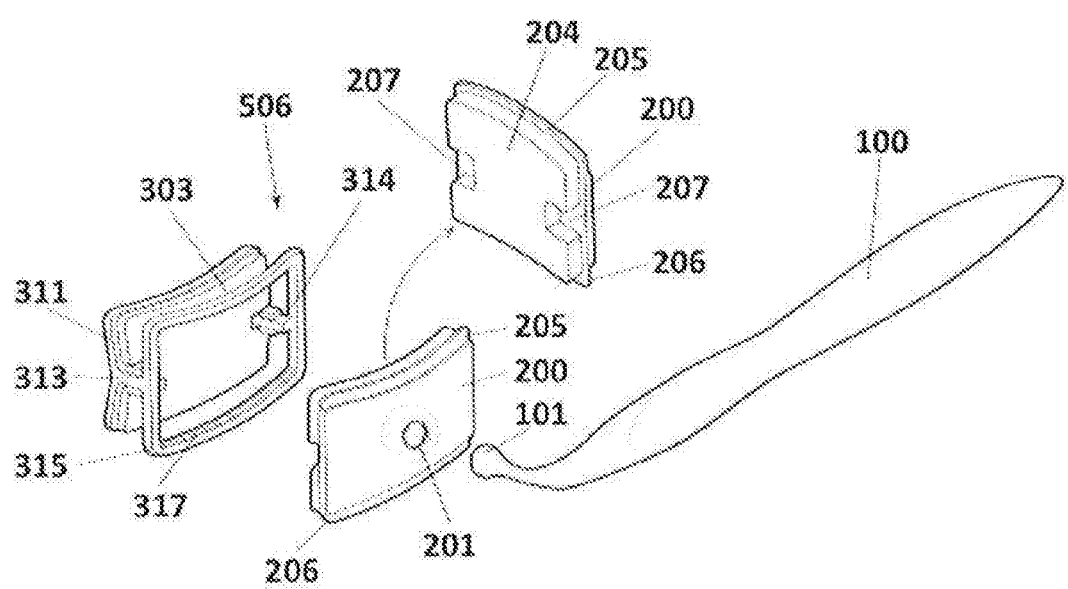
FIG. 10 shows an exploded view of a second embodiment of the assisted oral hygiene device in FIG. 7.

FIG. 10 shows another example with a cleaning device 506 with the same means of connection or attachment of head 200 to the frame 300 as in the device 505 of the above example. Specifically, the difference between the two devices 505, 506 is that the base or intermediate means of union of the device 506, of the latter embodiment, does not run along the rear wall 311 of the frame 300 from side to side dividing the frame 315 in two parts, one upper and one lower, but only has two lateral supports 313, 314 which serve to attach the mount 315 to the rear wall 311. Due to this configuration, the head 200 has its inner wall covered by means of dental cleaning 204, bristles or similar, except in two side areas of this surface where these supports 313, 314 of the frame 300 are inserted. The remaining components of this device 506 are the same as the device 505 of the above example.

In either tooth cleaning device 505, 506 of the previous examples, comprising a mount 315 with tracks 317 in which the top sides 205 and bottom sides 206 of a head are coupled, in addition to said tracks and sides that enable the vertical displacement of the head 200 relative to the frame 300, it is possible to further incorporate lateral tracks in the mount so that the sides of the head can enter into them and thus allow horizontal or even circular movement to the already available vertical movement of the head relative to the frame.

Figure 11A:
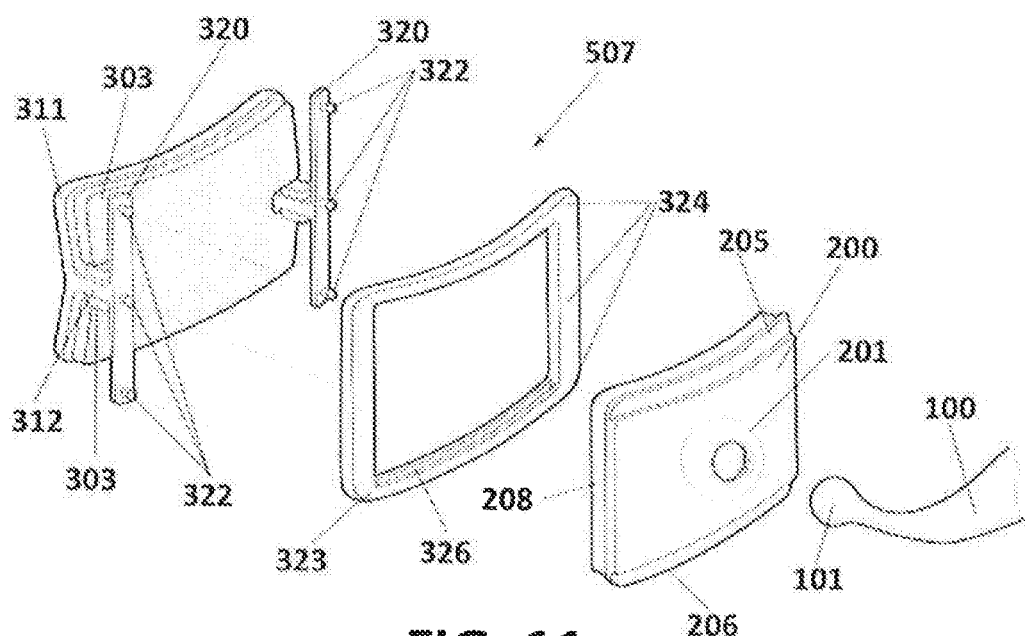
FIG. 11a shows an exploded view of a third example of the assisted oral hygiene device.
Figure 11B:
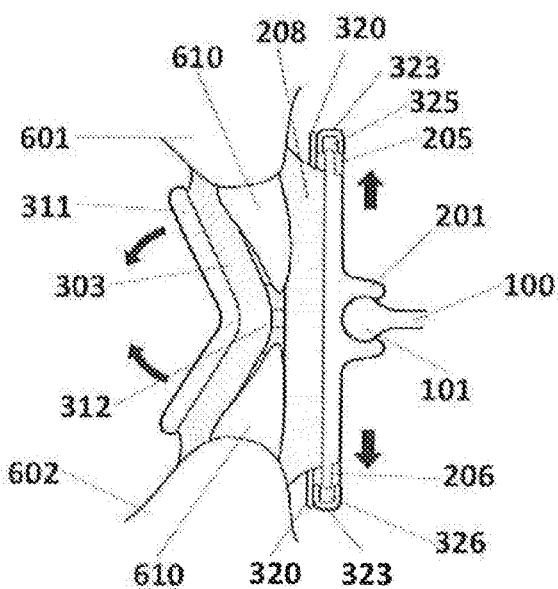

In an alternative to the above examples, another example of dental device 507, is shown in FIGS. 11a and 11b, and comprise, as means of connection with the head 200, instead of an integrated mount 300 integrated into the frame 315, two vertical supports 320, integral with the horizontal supports 313, 314 which connect the front of the frame 300, in this case the vertical supports 320 with the rear wall 311. These vertical supports 320 comprise of lugs 322 for the coupling by pressure of the mount 323 with holes 324. This mount comprises upper and lower tracks 326 intended to house the upper side 205 and lower side 206 of the head to allow its vertical movement relative to the frame 300. In this example, the inner surface of head 200 is completely covered with the means for cleaning the teeth 208.

FIG. 11b shows a section of the dental device 507 shown in FIG. 11a, applied in cleaning the upper and lower front teeth 610. In it the way the device 507 fits within the oral cavity can be observed. In particular, the upper and lower parts of the rear wall 311, are inclined backwards to accommodate variations in the angle between the gums 601, 602 and the teeth 610 without hurting the user of the device. Also, the means for cleaning, that in the example shown are bristles, adapt to the shapes of the mouth to be able to clean the different gaps both between the teeth 610 and between the teeth 610 and gums 601, 602.

In the above examples, the upper part or portion and the lower part or portion of the rear wall 311 form an obtuse angle, approximately of 110°, with the intermediate means of union 312, 313, 314, when the devices are not in use and can reach 130 degrees with the intermediate means of union when the device is in use. The fact that the angle may vary during use, allows the rear wall 311 to fit the size of the teeth and the shape of the mouth.

Figure 12A:
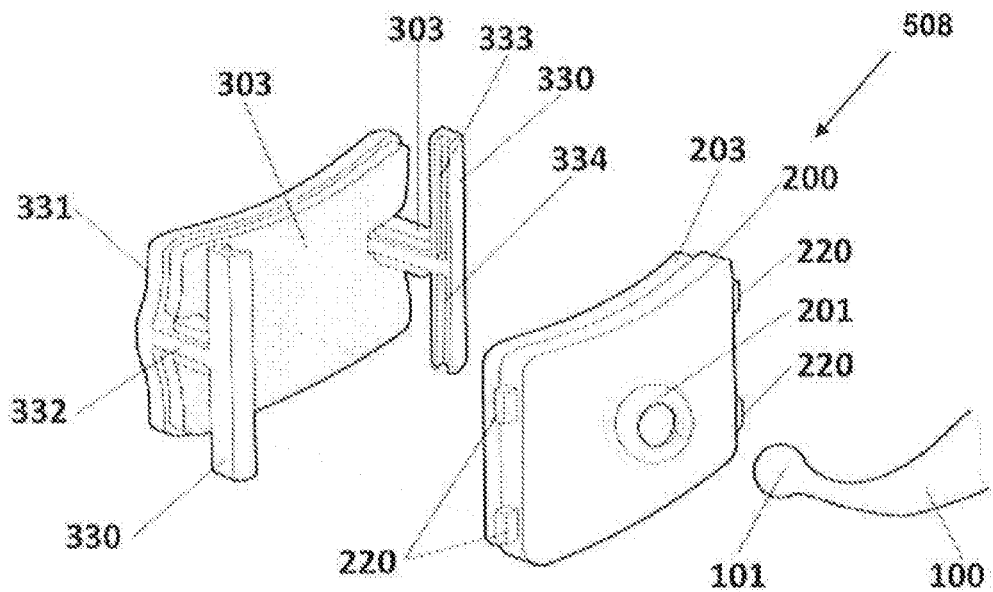
FIG. 12a shows an exploded view of a fourth example of the assisted oral hygiene device.
Figure 12B:
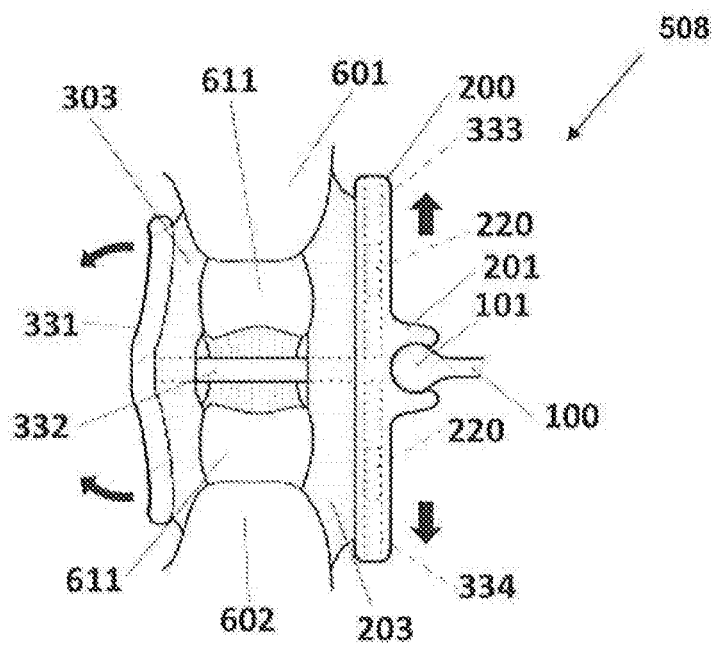

FIGS. 12a and 12b show a last example of the dental device 508 according to the present invention. In particular, it shows a device 508 with a similar configuration to the previous dental device 507 and comprises as means of connection on the frame 300, instead of the vertical supports 320, vertical supports 330 with vertical tracks 333, 334 joined by two horizontal supports 332 to the rear wall 331 of the frame 300. These vertical guides 333, 334 are divided into two parts, an upper 333 and lower 334, preferably of the same length, inside which four projections 220 move, two of which are located on each of the sides of the head 200. These projections are spaced so that each move along one of the four parts in which the tracks 330 of the frame are divided, thus enabling vertical movement of the head 200 relative to the frame 300 without the risk that the head 200 leaves the frame 300.

The device 508 of this example comprises an alternative rear wall 331 to that shown in the above examples. In particular, the rear wall 331 shows a top and a bottom part that instead of being inclined towards the rear of the device are inclined towards the front of the device, that is, towards the head 200. This alternative configuration of the rear wall 331 of the frame 300 also allows the device to reach the spaces between the teeth 611, and between the teeth 611 and gums 601, 602, regulating the length of the means of cleaning 303, 203. This rear wall 331 also enables, due to its construction and material, a movement of the upper and lower parts of the rear wall 331 relative to the horizontal supports 332 that join this wall 331 with the vertical supports 330.

The upper part or portion and the lower part or portion or lower of the rear wall 331 of this device 508 forms an acute angle of approximately 75° with this horizontal support 332 when the device 508 is not in use, and may reach 95° with this support when the device is in use. The fact that the angle may vary during use, allows the rear wall 331 to fit the size of the teeth and the shape of the mouth.

In view of the above examples, it goes without saying that an expert in this field could combine the components and constructional features of the different examples in order to develop a tooth cleaning device according to the features included in claim 1. In particular, an expert could combine any of the possible arrangements of the rear wall of the frame, that is, outwardly concave towards the outside of the mouth or concave towards the interior of the mouth, with the various possibilities of coupling between the frame and the head.

Figure 13:
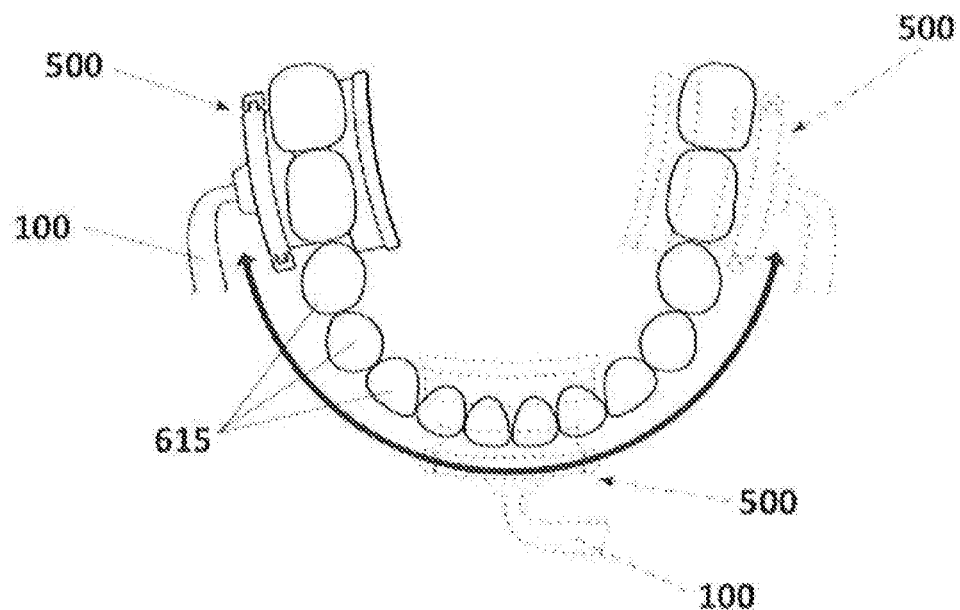
FIG. 13 shows a top view of a mouth arch in which three positions of the of the assisted oral hygiene device object of the invention is shown.
Figure 14:
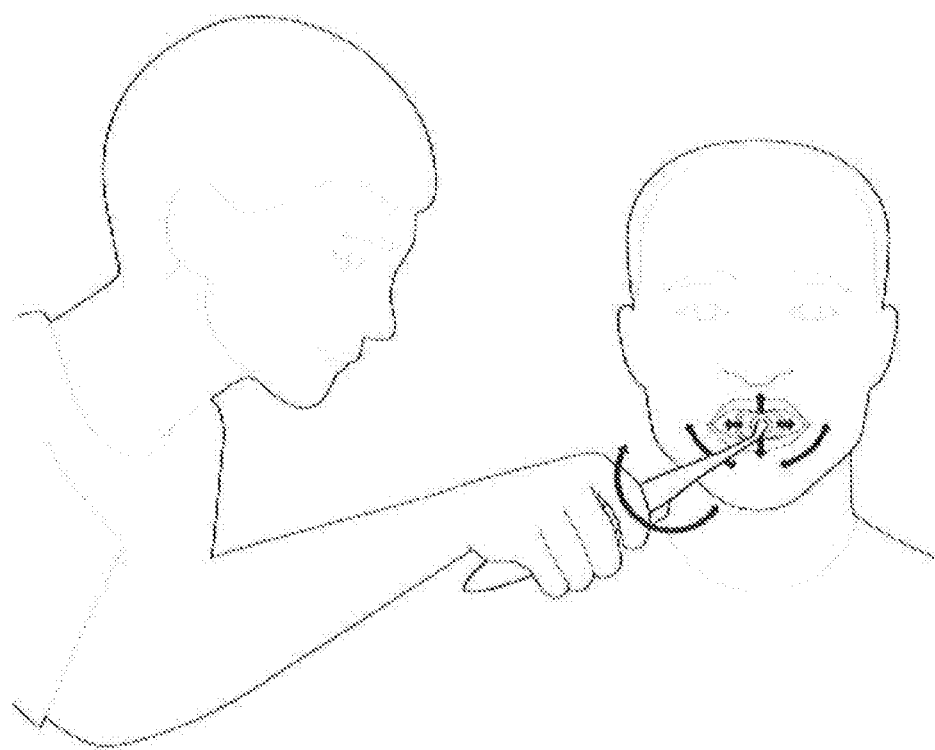
FIG. 14 shows a front view of a person brushing another's teeth with the of the assisted oral hygiene device object of the invention.

FIGS. 13 and 14 show examples of use of the devices object of the invention, so that whoever is holding the handle, can easily and without risk of harm to the person who is getting their teeth brushed, move the means for cleaning the teeth arranged in the head of the device, at least vertically, as well as the means for cleaning arranged on the frame and the head, along the dental arches, from left to right or vice versa. Thus, once the user who is getting their teeth cleaned, has introduced their teeth between the rear wall of the frame, the intermediate means of union and the head, with its means of connection, that is, in a section that roughly represents a H, the person assisting them can move, with the help of the handle, the frame along the arches, and the head over the teeth, at least vertically.

Preferably, both the frame and the head are of a pliable material (rubber or similar) that allows the adaptation and adjustment of the pressure of the device on the teeth so that an effective removal of biofilm attached to them is achieved.

The invention claimed is:

1. An assisted dental cleaning device, comprising:
   a frame with means for cleaning the teeth,
   a head with means for cleaning the teeth,
   means of connection between the head and an interior of the frame allowing at least vertical movement over the teeth of the head, relative to said frame, the means of connection providing sliding contact between the head and the frame to enable the relative movement,
   a handle, and
   means of coupling between an external part of the head and the handle that enables rotation of the handle with respect to the head.

2. The device according to claim 1, wherein the frame has a body comprising at least:
   a rear wall,
   means of connection for receiving the head, opposite the rear wall and forming the front of the frame, and
   intermediate means of union that are horizontally arranged between the rear wall and the means of connection, joining the rear wall and the means of connection.

3. The device according to claim 2, wherein the means of connection comprise a front wall, joined to a rear wall, by the means of intermediate union, with the front wall having holes in which lugs are housed that are arranged in the rear part of the head facing the front wall, being coupled to these lugs, on the other side of the front wall, the means for cleaning the teeth which are cleaning plates so that the front wall of the frame is located between the plates and the head.

4. The device according to claim 3, wherein the holes are diamond-shaped, circular or with a vertical slot.

5. The device according to claim 2, wherein the means of connection comprise a mount inside which the head is inserted with sides that are placed into at least two tracks or rails arranged in two of the opposite sides of the mount for the movement of head along those tracks.

6. The device according to claim 5, wherein guides are placed on the vertical sides of the frame.

7. The device according to claim 5, wherein the tracks are in the horizontal, upper and lower sides of the frame.

8. The device according to claim 5, wherein the inside of the head comprises means for cleaning the teeth.

9. The device according to claim 2, wherein the means of connection of the frame comprises two vertical supports with lugs to which a separate mount is joined and these means of connection are joined to the rear wall of the frame by intermediate means of union, and the frame comprising at least two tracks or rails located on two opposite sides of the mount into which the sides of the head are introduced in order to move along those tracks.

10. The device according to claim 2, wherein the means of connection comprise two vertical supports each with a track or rail, into which one side of the head is placed to allow the movement of the head along these tracks.

11. The device according to claim 2, wherein the means of intermediate union comprise a horizontal body that runs along the front of the rear wall, dividing this in two and joining the rear wall with the means of connection.

12. The device according to claim 2, wherein the means of intermediate union comprise a horizontal body in each of the sides that connect the rear wall with the means of connection.

13. The device according to claim 1, wherein the rear wall is separated into two parts by intermediate means of union, determining an upper portion and a lower portion.

14. The device according to claim 13, wherein each of these portions may have an angle of between 45° and 105° with the means of intermediate union mentioned.

15. The device according to claim 1, wherein the means of cleaning comprises bristles.

16. The assisted dental cleaning device according to claim 1, wherein the means of coupling is a ball and socket joint.

17. The assisted dental cleaning device according to claim 1, wherein the means of connection between the head and an interior of the frame allows at least vertical movement over the teeth of the head, and within said frame.

18. An assisted dental cleaning device, comprising:
a frame with bristles, towelettes or sponges for cleaning the teeth,
a head with bristles, towelettes or sponges for cleaning the teeth,
a sliding joint between the head and an interior of the frame allowing at least vertical movement over the teeth of the head, relative to said frame,
a handle, and
a rotatable joint between an external part of the head and the handle.

19. The assisted dental cleaning device according to claim 18, wherein the rotatable joint is a ball and socket joint.

20. The assisted dental cleaning device according to claim 18, wherein the means of connection between the head and an interior of the frame allows at least vertical movement over the teeth of the head, and within said frame.

* * * * *